Sept. 15, 1959 CHOU H. LI 2,903,906
CONTROL APPARATUS
Filed Sept. 23, 1954 2 Sheets-Sheet 1
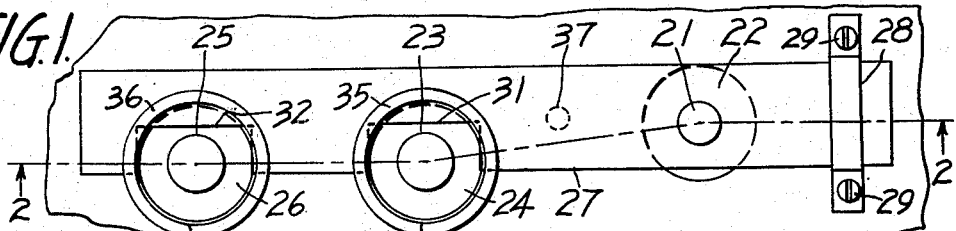
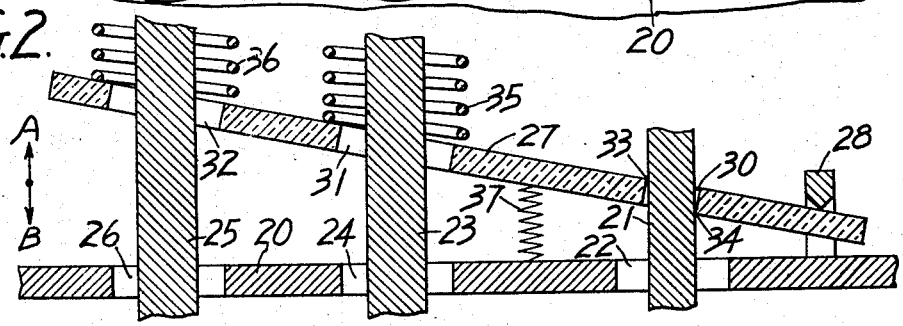
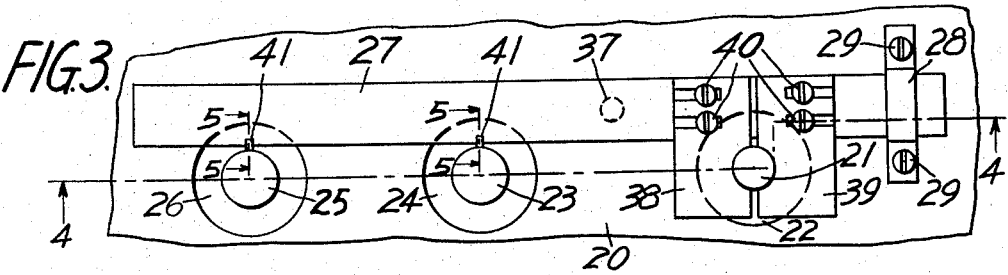
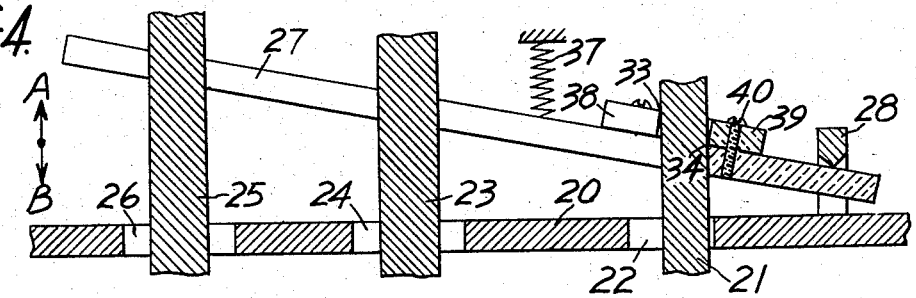
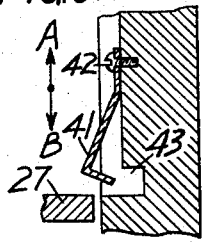
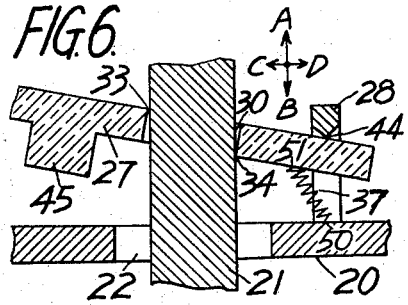
INVENTOR.
Chou H. Li Sept. 15, 1959    CHOU H. LI    2,903,906
CONTROL APPARATUS
Filed Sept. 23, 1954    2 Sheets-Sheet 2

INVENTOR.
Chou H. Li

United States Patent Office 2,903,906
Patented Sept. 15, 1959

2,903,906

CONTROL APPARATUS

Chou H. Li, Newark, N.J.

Application September 23, 1954, Serial No. 457,830

11 Claims. (Cl. 74—529)

This invention relates to control apparatus, and in particular to apparatus for controlling the operation of vehicles. While not limited thereto, the invention is herein described as applied to an automobile.

The usual automobile includes an accelerator pedal for controlling the speed of the vehicle. The automobile driver is normally required to maintain this pedal depressed while driving. This usually involves the maintenance of the driver's right foot, and thus the lower right portion of his body, in a relatively fixed position. In addition to the discomfort involved in maintaining such a posture over a period of time, this driving requirement introduces a hazard in the operation of the automobile. The immobilization of the driver's right foot during driving reduces the speed of response during emergencies—for example, it may take the driver a longer than usual period of time to depress a brake pedal when the right foot has previously been used to operate the accelerator pedal over a long period of time.

Accordingly, an important object of the invention is to provide improved means for better enabling a driver to maintain control over the performance of a moving vehicle.

A further object of the invention is to provide improved control apparatus for facilitating the starting of a vehicle on the side of a hill.

Yet another object of this invention is the provision of improved accelerator control apparatus of a type especially useful to handicapped people.

A still further object of the invention is to provide an improved control apparatus for operating automobile brakes, and wherein the brakes may be maintained in a braking operation until automatically released by actuation of an accelerator pedal.

The foregoing and related objects are realized in control apparatus according to the invention described in the following specification, claims, and drawing. In the drawing:

Fig. 1 is a plan view of an embodiment of control apparatus of the invention as applied to an automobile;

Fig. 2 is a sectional view of the apparatus of Fig. 1 taken along line 2—2 of Fig. 1;

Fig. 3 is a plan view of apparatus similar to that of Fig. 1 but wherein some of the operating elements are illustrated as taking a form different from that of the elements of Fig. 1;

Fig. 4 is a sectional view of the apparatus of Fig. 3 taken along line 4—4 of Fig. 3; and Fig. 5 is an enlarged, fragmentary, sectional view of the spring catch resilient spring means used in the embodiment of Fig. 3, and taken along the line 5—5 of Fig. 3.

Figs. 6 through 14 are illustrations of the apparatus of Figs. 1 and 2 with modifications wherein:

Fig. 6 is a fragmentary sectional view of a portion of apparatus similar to that of Fig. 1 but wherein the control means, in addition to including the features of the apparatus of Fig. 1, includes a mounting for transverse as well as for vertical movement. The control means are here illustrated in an active position;

Fig. 7 is a view of the apparatus of Fig. 6 wherein the control means are illustrated in an inactive position;

Fig. 8 is a fragmentary sectional view of the apparatus of Fig. 7, but modified so that vertical return movement of the control apparatus is realized by a weight instead of by the spring means of the apparatus of Figs. 1 through 7;

Fig. 9 is a fragmentary sectional view of a portion of the apparatus of Fig. 1 wherein a cam arrangement is used in place of the spring means of Figs. 1 through 7 or the weight means of Fig. 8;

Fig. 10 is a fragmentary sectional view of yet another modification of the apparatus of Fig. 1, and wherein two separate, but cooperating, control members are used to perform the desired control operation;

Fig. 11 is an enlarged plan view showing control means similar to that of Figs. 3 and 4, but wherein the control surfaces have contours different from those of the control surfaces of Figs. 3 and 4;

Fig. 12 is a sectional view taken along the line 12—12 of Fig. 11;

Fig. 13 is an enlarged plan view showing control means having still another control surface contour arrangement; and Fig. 14 is a sectional view taken along the line 14—14 of Fig. 13.

Figure 7:
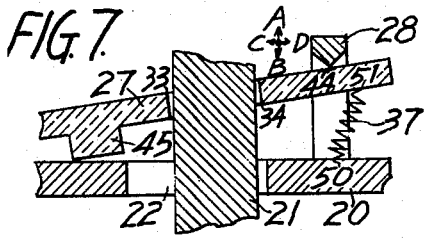

Referring now to Figs. 1 and 2, the control apparatus of the invention is illustrated as embodied in an automobile. The control apparatus of the invention is here used in combination with the usual automobile accelerator pedal (not shown) connected to an accelerator pedal support element or rod 21. The accelerator rod 21, the member to be controlled, is mounted for movement in generally upward and downward directions through an opening 22 in the floor or firewall 20 of the automobile. This accelerator pedal rod 21 is used to control the automobile carburetion system (not shown) in the usual manner. The accelerator pedal, as determined by the vertical position of the accelerator rod 21, has an idle position and is biased to retract (in direction A, Fig. 2) to this position in the absence of an external force, such as the force normally applied by a driver's foot. The automobile, as is conventional, also has a brake pedal (not shown) connected to a brake pedal rod 23 mounted for generally upward and downward movement through another opening 24 in the floor 20 to control the brake system (not shown) in the usual manner. The brake pedal, as determined by the vertical position of the brake pedal rod 23, is also spring biased so as to be provided with an idle position. The automobile may also have a clutch pedal rod 25, with this rod 25 also being mounted for generally upward and downward movement through yet another opening 26 in the same floor 20.

In accordance with the invention, a control or operating member 27 is mounted on the floor 20 adjacent to the pedal rods 21, 23, and 25. One end of the control member 27 is connected to the floor 20, with a portion of the member positioned for direct access to a driver or operator of the automobile. The connection of the control member 27 to the floor 20 is here accomplished by means of a stirrup 28 and two screws 29. The control member 27, which may be stamped out of sheet metal of suitable thickness, includes portions that define a hole 30 and two slots 31 and 32 to receive the accelerator pedal rod 21, brake pedal rod 23, and clutch pedal rod 25, respectively. The hole 30 is of a size only slightly larger than the diameter of the accelerator pedal rod 21, with parts of the hole-defining portions taking the form of gripping means or edges 33 and 34, Fig. 2. Resilient compression spring means 35 and 36 are illustrated as being provided to connect the brake pedal rod 23 and clutch pedal rod 25, respectively, with the control member 27. Another resilient compression spring means 37, disposed intermediate the control member 27 and the floor 20, yieldably urges the control member 27 to move in direction A until the gripping means 33 and 34 engage the accelerator pedal rod 21. Engagement of the gripping means 33 and 34 with the accelerator rod 21 restains the rod 21 from further movement in direction A and return to its idle position, but allows the rod 21 to be moved in the opposite direction B past the gripping means 33 and 34. The above engagement is ended when the driver steps on the brake or clutch pedal whereupon the resilient compression spring means 35 and 36 forces down the control member 27 against the force of the other compression spring resilient means 37. Alternatively, the operator may step directly on the control member 27. When the control member is moved downwardly, the accelerator pedal rod 21 is released and it returns to its idle position.

The control apparatus described controls the position and motion of the accelerator pedal rod 21, which in turn controls the speed and performance of the automobile. Once the accelerator pedal (not shown) is depressed (in direction B), the gripping means 33 and 34 of the control member 27 maintains the accelerator pedal, and thus the accelerator pedal rod 21, in its depressed position. The driver, therefore, need not hold his foot on the accelerator pedal in order to maintain it in position. As soon as the driver depresses the brake or clutch pedal, for example in slowing down or in changing gears (or steps on the control operating member 27), the accelerator pedal rod 21 is automatically disengaged from the gripping means 33 and 34 and returns to its idle position, thereby idling the automobile engine. The accelerator pedal rod 21 is then ready to be set and held again.

Figs. 3 and 4 illustrate a modification of the apparatus of Figs. 1 and 2. Instead of being integral with the control member 27, the gripping means 33 and 34 are here made up of separate gripping elements 38 and 39 adjustably secured to the control member 27 by means of screws 40. The three pedal rods 21, 23, and 25 pass closely adjacent to one side of the control member 27, instead of passing through openings as in the apparatus of Fig. 1; and the resilient means 37, here positioned intermediate the control member 27 and a portion of the automobile opposite the floor 20, is here in tension instead of compression. The function of the resilient spring means 35 and 36 of Figs. 1 and 2 are here performed by resilient spring means in the form of spring catches 41. The spring catches 41 are fixed to the brake and clutch pedal rods 23 and 25 by means of screws 42 (Fig. 5). These spring catches 41 engage the control member 27 so that, when the brake or clutch is actuated, the control member moves with the brake or clutch pedal rod 23 or 25 (in direction B) thereby releasing the accelerator pedal rod 21 from the gripping means 33 and 34. However, when the pedal rods 23 or 25 return (in direction A), the spring catches retract into recesses 43 in these rods. To facilitate the operation of the spring catches 41, either the left portion (Fig. 5) or the whole of the control member 27 may be made of a springy material. The use and operation of this control apparatus is the same as that described with respect to the apparatus of Figs. 1 and 2.

Figs. 6 and 7 are fragmentary sectional views of another modification of the control apparatus of Figs. 1 and 2. The control member 27 of the apparatus of Figs. 6 and 7 is mounted for transverse movement (directions C and D in Fig. 6) as well as for vertical movement (directions A and B). A feature of this mounting for transverse movement is that the gripping means 33 and 34 have inactive as well as active positions, with the gripping means being adapted to be thrown into the desired positions automatically. Advantage is taken of the fact that while the member to be controlled (the accelerator pedal rod 21) is mounted for generally vertical movement, in the usual automobile it is also adapted to move a small distance in directions C and D. On my 1948 Frazer sedan, on which the apparatus of the invention is installed, the accelerator pedal rod 21 is capable of transverse movement of as much as one-half of an inch in planes parallel to the plane of the floor 20. This distance may, of course, be increased. The resilient compression spring means 37 may here comprise a compression spring connected at one end to a point 50 on the floor 20 below the stirrup 28. The other end of the resilient means 37 is connected to the control member 27 at a point 51 such that when the accelerator pedal rod 21 and the control member 27 are moved in transverse direction C, the resilient means 37 forces the left side (Fig. 6) of the control member 27 to move upwardly in direction A thereby throwing the gripping means 33 and 34, by overcenter snap action, into its operative position (as shown in Fig. 6), whereas when the accelerator pedal rod 21 and the control member 27 are moved in direction D, the compression spring means 37 forces the left side of the control member 27 to move downwardly in direction B, thereby inactivating the gripping means 33 and 34 (as shown in Fig. 7). By overcenter snap action is meant the type of mechanical movement where an element is biased (as by a spring) so that it can assume only either one of two positions; when the element is gradually moved in a direction from an initial position toward the second position, the element first tends to return to its initial position until, after a certain point is reached, the element tends to snap towards its second position. The element then tends to remain in the second position until moved beyond the point toward the initial position. In the apparatus of Figs. 6 and 7 the element is the control member 27 and the biasing is realized by the compression spring 37. The two positions are, respectively, the positions of the control member 27 illustrated in Figs. 6 and 7. The point at which the biasing changes from a biasing toward the first position to a biasing toward the second position is the place where point 51 and the knife edge 44 are most closely adjacent to each other. A resilient means 37 in tension may also be used to effect the overcenter snap action described; in such a case the means is connected between the control member point 51 and a point on the automobile above the stirrup 28. The lower side of the stirrup 28 may also be formed to approach a knife edge 44, as shown, for more efficient working of the apparatus. A positioning means or stop 45 may be provided, the stop being fixed to the control member 27, as shown, or to the floor 20 of the automobile.

The control apparatus shown in Figs. 6 and 7 may be used in generally the same way as the apparatus of Figs. 1 to 5. In the apparatus of Fig. 6 the gripping means 33 and 34 is normally in its inactive position (Fig. 7) until thrown into its active position (Fig. 6) by the motion of the accelerator pedal rod 21 in direction C. The control apparatus may thus be easily put into or out of operation by a simple motion of the driver's right foot. An accelerator pedal rod 21 held by the control apparatus in its active position may be released by the driver's actions described above (that is, by operating the brake or clutch pedals), or by moving the accelerator pedal rod 21 in direction D to bring the gripping means 33 and 34 into its inactive position.

Figure 8:
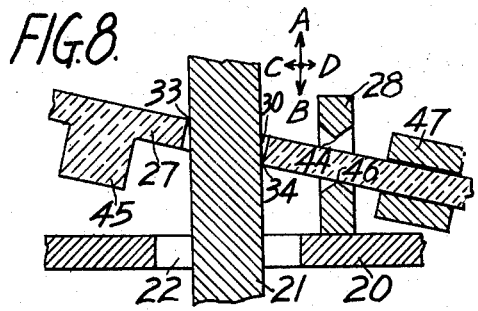

Fig. 8 illustrates a modification of the apparatus of the invention wherein the force of gravity (due to the presence of a weight 47 fixed to the control member 27) is used in place of the mechanical force of the resilient means 37. This weight 47 is used to actuate the gripping means 33 and 34 in response to transverse movement (in directions C or D) of the accelerator pedal rod 21. In the apparatus of Fig. 8 an additional lower supporting means or knife edge 46 is provided for supporting the control member 27. The weight 47 is fixed to an end portion of the control member 27 so that transverse movements of the accelator pedal rod 21 and the control member in directions C or D will cause the left side of the control member 27 to tilt in, respectively, directions B or A, thereby respectively inactivating or activating the gripping means 33 and 34.

Figure 9:
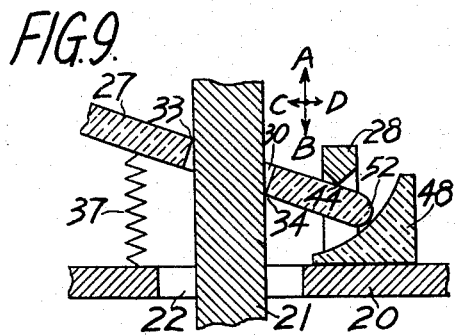

Fig. 9 illustrates a cam type actuating means useful in operating the gripping means 33 and 34. In this figure a cam 48 fixed to the floor 20, and a cam follower 52 fixed to the control member 27, cooperate with the resilient means 37 and the supporting means or knife edge 44 to selectively tilt the left side of the control member 27 in directions A or B in response to movements in directions C or D, respectively, of the accelerator pedal rod 21. These movements actuate the gripping means 33 and 34.

Other modifications of the control apparatus grip actuating means are feasible. For example, referring to Figs. 6 and 7, one such grip actuating means may comprise a supporting means or knife edge 44 selectively movable in directions C and D relative to the connection point 51 of the control member 27. Another grip actuating means may comprise a resilient means 37 having the connection point 51 slidably movable along the control member 27. Yet another grip actuating means may comprise a knife edge 44 movable in directions A and B relative to the connection point 51. A further grip actuating means may comprise a resilient means 37 operable selectively in tension or compression. All of these grip actuating means operate to cause the control member 27 to move, with respect to the accelerator pedal rod 21, to thereby activate or inactivate the gripping means 33 and 34. The forces required to operate the grip actuating means may in each case be applied either directly or indirectly to the accelerator or brake pedal.

The resilient means 37 in all of the aforedescribed apparatus may be adjusted to be relatively slow in response to movement of the accelerator pedal. The gravity actuated means of Fig. 8 may also be provided with a slow response by suitably positioning or dimensioning the weight 47. An added way of temporarily terminating the engagement between the gripping means 33 and 34 and the accelerator pedal rod 21 may then be had by moving the rod 21 quickly downwardly in direction B, and then immediately removing the force on the rod 21 before the resilient means 37 (or the weight 47) starts to act on the control member 27.

I have found that the resilient actuating means 37 for the gripping means 33 and 34 is not an absolute necessity. Apparatus essentially similar to that shown in Fig. 8, without the weight 47 and the lower supporting means 46 but with accurately dimensioned gripping means 33 and 34, positioning means 45, and supporting means 44, may accomplish the function of the control apparatus shown in Fig. 8.

Figure 10:
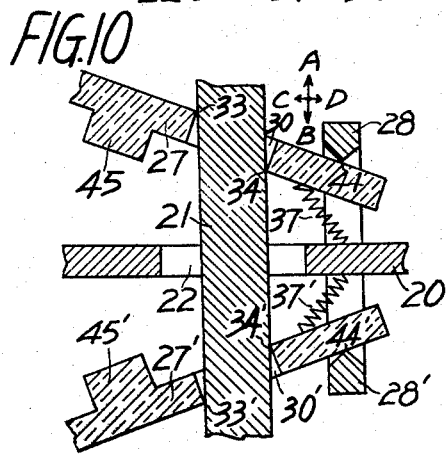

Fig. 10 illustrates how the accelerator pedal rod 21, or any other member to be controlled, may be preserved from movement in longitudinal directions A and B (for maintaining constant speed) by the use of two like control members in combination; in such a case each of the control members are preferably similar to those shown in Figs. 6 and 7.

The invention also proves useful in starting a vehicle of the kind requiring a shifting of gears, especially when it is parked on the side of a hill. This is realized by first depressing the accelerator pedal. The control member of the apparatus holds the accelerator pedal in the depressed position. When the engine is started this arrangement causes the engine to run at a relatively high speed. Gears are then engaged and the clutch pedal is slowly released. Gears may be changed if necessary. In this way, a stalled engine is avoided and smooth starting assured.

Apparatus according to another form of the invention may instead be used to selectively hold the brake pedal rod 23 depressed rather than the accelerator pedal rod 21. In such a case the function of the brake pedal rod is substituted for the accelerator pedal rod in the apparatus described. The holding or gripping action may be automatically removed when the accelerator pedal is depressed. As the brake pedal rod 23 can also (to some extent) move transversely, the construction of the above-described control apparatus may be substantially duplicated in this application. This modified form of apparatus makes it possible to uniformly slow down or park on the side of a hill without requiring further action on the part of the driver.

The use of the invention is not limited to use in connection with accelerator or brake pedal rods. Instead of the accelerator pedal rod 21, for example, any other movable members to be controlled may be automatically subjected to the automatic hold and release actions provided by apparatus of the invention.

The gripping means 33 and 34 described are preferably of a material exhibiting high friction characteristics. As an example, it may be made of rubber. The shape of the gripping means may also be varied. While the gripping elements 38 and 39 of Figs. 3 and 4 are described as having similar gripping means 33 and 34, this similarity may be undesirable in some cases. For example, the gripping means 33 and 34 may be made long and wide to conform to the controlled member (the acceleration rod 21) in its longitudinal and transverse planes. Alternatively, as required, the same means 33 and 34 may also be short and narrow or thin and have rounded edges.

Figure 11:
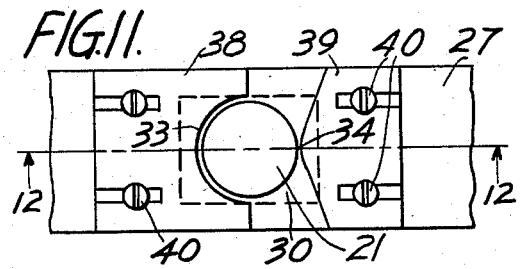
Figure 12:
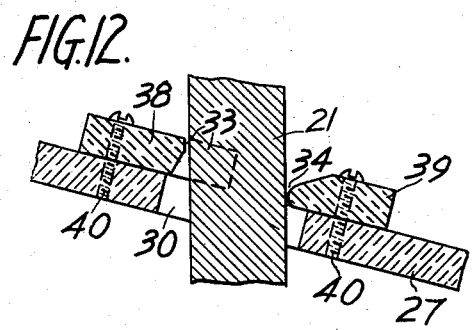

Figs. 11 and 12 each show a pair of gripping elements 38 and 39 where one element 38 exhibits an elongated, sharp gripping edge 33, whereas the other gripping element 39 has a much shorter, thinner, rounded edge 34. The first gripping edge 33 is here chiefly relied on to hold the accelerator pedal rod 21, while the second gripping edge 34 is used merely to position the same pedal rod 21.

Figure 13:
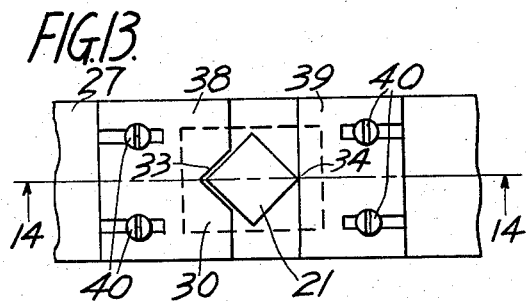
Figure 14:
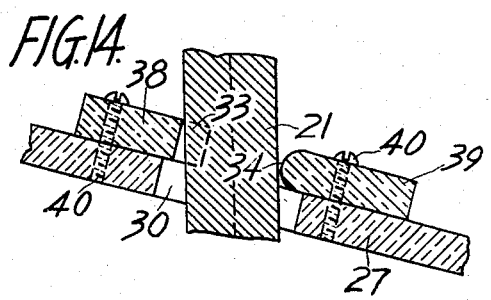

Referring now to Figs. 13 and 14, it is seen that the gripping means 33 and 34 need not conform to the contour of the controlled working member. The controlled member may therefore be non-circular in cross-section, or even have irregular or varying cross-sections along that part of its length which is in operative association with the gripping means 33 and 34. Figs. 13 and 14 are enlarged sectional views of a set of gripping elements 38 and 39 in apparatus where the controlled member, the accelerator pedal rod 21 in the example, is non-circular in cross-section.

The clearance between the gripping means 33 and 34 and the controlled member in the above examples is very critical. If the clearance is too large or too small, the control apparatus may achieve undesired results, or none at all. Careful and extended tests have shown that the optimum clearance depends on factors including the type of the control apparatus to be used; the diameter, or maximum dimension, of the portion of the controlled member to engage the control member; the selection, shape, and thickness or width of the gripping elements 33 and 34; and the diameter, material and surface condition of the controlled member. As applied to conventional automobile controls, with steel gripping means ⅛" thick and a steel controlled member ⅜" in diameter, the optimum clearance ranges are (a) from 0.010" to 0.030" for cases where the gripping means have only active positions, and (b) from about 0.020" to 0.060" for cases where the gripping means have both active and inactive positions. In general, for controlled members of other shapes and sizes than those illustrated, and with gripping means ⅛" thick, the optimum clearances for cases (a) and (b) are, respectively, from about 2 to 10%, and from about 5 to 20% of the diameter (or maximum dimension along the control member) of the controlled member.

What is claimed is:

1. Control apparatus for a vehicle of the type having an accelerator pedal mounted for substantially vertical movement and, extending therefrom, a rod having substantially smooth opposite side portions, said apparatus comprising: a control pedal mounted for substantially vertical movement in engageable relation with said accelerator pedal rod, a portion of said control pedal defining gripping edges positioned to engage said opposite side portions of said rod for securing said rod to said control pedal thereby to determine the vertical position of said accelerator pedal, said control pedal being movable independently of said accelerator pedal and being mounted for overcenter snap action movement to and from engageable relation with said rod.

2. Control apparatus for a vehicle, comprising: a control member mounted for direct access to an operator of said vehicle and for movement in a direction having a vertical component of motion; spring means connected to said control member to normally urge said member in a direction including an upward component of motion; said member including portions thereof defining a substantially vertically extending passageway having a pair of member gripping edges on, respectively, opposite sides of said passageway; an accelerator pedal member mounted for substantially vertical movement and having substantially smooth opposite side portions; said accelerator pedal member extending through said passageway with each of said control member gripping edges engageable with one of said side portions of said accelerator pedal member, said control member being movable independently of said accelerator pedal and being mounted for stable positioning in substantially only either one of two stable positions, with said control and controlled members being in engagement in one of said stable positions and being out of engagement in the other of said stable positions.

3. Control apparatus for a vehicle comprising, in combination: vehicle accelerator and brake pedal members mounted for substantially vertical movement, said accelerator pedal member having substantially smooth opposite side portions; a control pedal tiltably mounted both for generally horizontal and vertical movement in engageable relation with said accelerator pedal member, a portion of said control pedal defining gripping edges positioned to substantially simultaneously engage said opposite side portions of said accelerator pedal member for securing said accelerator pedal member to said control pedal thereby to fix the vertical position of said accelerator pedal member, said control pedal being movable independently of said accelerator pedal member and being mounted for overcenter snap action movement to and from engageable relation with said accelerator pedal member; and resilient means connected between said brake pedal member and said control pedal to disengage said control pedal from said accelerator pedal member when said brake pedal member is moved in a downward direction.

4. Control apparatus for a vehicle, comprising: a vehicle frame; a control member mounted for direct access to an operator of said vehicle and for movement in a direction having a vertical component of motion; spring means connected to said control member to normally urge said member in a direction including an upward component of motion; said control member including portions thereof defining a vertically extending passageway having a pair of member gripping edges on, respectively, opposite sides of said passageway; an accelerator pedal rod mounted for substantially vertical movement and having substantially smooth opposite side portions; said rod extending through said passageway with each of said control member gripping edges engageable with one of said side portions of said rod; said control member being movable independently of said accelerator pedal with respect to said frame; a brake pedal rod mounted for substantially vertical movement and extending in a substantially vertical direction closely adjacent to said control member; and resilient means connected between said brake pedal rod and said control member to move said gripping edges of said control member in a direction out of engagement with said accelerator pedal rod during a downward movement of said brake pedal rod.

5. The apparatus claimed in claim 4 wherein said resilient means comprises a spring catch.

6. The apparatus claimed in claim 4 wherein said control member is also mounted for substantially horizontal overcenter snap action movement to move said gripping edges thereof substantially simultaneously into engagement with said side portions of said accelerator pedal rod in one overcenter position of said control member, and out of engagement with said side portions in the other overcenter position of said member.

7. The apparatus claimed in claim 4 wherein said resilient means is a compression spring.

8. Control apparatus for a vehicle, comprising: a vehicle frame; a controlled member; and a control member; said control member being mounted for direct access by an operator of said vehicle for direct control thereby and being movable with respect to said frame independently of said controlled member; said controlled member being mounted for substantially vertical movement and having an elongated, vertically extending portion having substantially smooth opposite sides; said control member being mounted for overcenter snap action movement to and from engageable relation with said controlled member, a portion of said control member defining gripping edges normally biased to substantially simultaneously engage said opposite sides of said controlled member and restrain said controlled member from vertical movement during one relative positioning of said control and controlled members and to release said opposite sides during another relative positioning of said members, whereby the vertical position of said controlled member is adapted to be determined by direct setting of said control member.

9. The apparatus claimed in claim 8 wherein said control member is also mounted for movement in a horizontal direction, and wherein the snap action position of said control member is determined by the horizontal position of said control member.

10. Control apparatus for a vehicle, comprising: a control member mounted for direct access to an operator of said vehicle and for movement in a direction having a vertical component of motion; spring means connected to said control member to normally urge said member in a direction including an upward component of motion; said member including portions thereof defining a substantially vertically extending passageway having a pair of member gripping edges on, respectively, opposite sides of said passageway; an accelerator pedal member mounted for substantially vertical movement and having substantially smooth opposite side portions; said accelerator pedal member extending through said passageway with each of said control member gripping edges engageable with one of said side portions of said accelerator pedal member; said control member being movable independently of said accelerator pedal, and being mounted for substantially horizontally overcenter snap action movement to move said gripping edges thereof substantially simultaneously into engagement with said side portions of said accelerator pedal member in one snap action position of said control member, and out of engagement with said side portions in the other snap action position of said member.

11. The apparatus claimed in claim 10 wherein the maximum clearance between adjacent portions of said gripping edges and said side portions is of the order of .06 inch.

(References on following page)

References Cited in the file of this patent

UNITED STATES PATENTS

| | | |
|---|---|---|
| 788,950 | Sargent | May 2, 1905 |
| 1,602,107 | Hammond | Oct. 5, 1926 |
| 1,605,341 | Gilbrough | Nov. 2, 1926 |
| 1,937,085 | Johnson | Nov. 28, 1933 |
| 2,033,821 | Ellery | Mar. 10, 1936 |
| 2,085,352 | Cook | June 29, 1937 |
| 2,318,931 | Diver | May 11, 1943 |

FOREIGN PATENTS

| | | |
|---|---|---|
| 536,249 | Germany | Oct. 21, 1931 |
| 810,969 | Germany | Aug. 16, 1951 |